United States Patent [19]
Chen

[11] Patent Number: 5,263,800
[45] Date of Patent: Nov. 23, 1993

[54] WORK TABLE OF TOOLING MACHINE

[76] Inventor: Chih-Hung Chen, No. 11, Lane 79, Chung Hsiao Street, Feng Yuan, Taichung, Taiwan

[21] Appl. No.: 933,348

[22] Filed: Aug. 20, 1992

[51] Int. Cl.[5] .................................. B23Q 11/08
[52] U.S. Cl. ........................... 409/137; 29/DIG. 101; 408/234; 408/241 G; 409/134
[58] Field of Search .............. 408/234, 236, 237, 56, 408/61, 91, 241 G; 409/134, 137, 235, 241; 29/DIG. 50, DIG. 56, DIG. 63, DIG. 101

[56] References Cited

U.S. PATENT DOCUMENTS

| | | | |
|---|---|---|---|
| 3,366,012 | 1/1968 | Richter | 409/134 |
| 3,485,138 | 12/1969 | Staehle | 409/137 |
| 4,484,387 | 11/1984 | Nachmany | 409/137 |
| 4,950,113 | 8/1990 | Winkler et al. | 409/137 |
| 5,078,256 | 1/1992 | Hatano et al. | 409/137 |
| 5,113,558 | 5/1992 | Soroka et al. | 409/137 |

FOREIGN PATENT DOCUMENTS

| | | | |
|---|---|---|---|
| 62636 | 3/1988 | Japan | 409/134 |
| 1-321140 | 12/1989 | Japan | 409/134 |

Primary Examiner—Daniel W. Howell
Attorney, Agent, or Firm—Leonard Bloom

[57] ABSTRACT

An improvement for the work table of tooling machine comprises a base, a saddle and work table, and a single-bevel or double-bevel telescopic protection at respective side of saddle and work table. The base is located at the lowest position of machine and has horizontal (X axial) slide rails. The saddle is mounted at the base for X axial moving with the help of drive mechanism, and the saddle has longitudinal (Y axial) slide rails. The work table is mounted at the saddle for the drive mechanism sliding longitudinally along the slide rails. The saddle may slide laterally on the base and the work table may slide longitudinally on the saddle, and cutting waste produced during the process is automatically discharged into the collection tank with the help of bevel side of telescopic plate at respective sides of saddle and work table, mutual thrust force and high pressure fluid flush along the bevel side of the plate in order to reach the purpose of automatic disposition.

6 Claims, 3 Drawing Sheets

WORK TABLE OF TOOLING MACHINE

SUMMARY OF THE INVENTION

The present invention relates to an improvement for work table of tooling machine, and particularly to an improved work table of tooling machine comprising horizontal (or X axial) sliding (guide) rails and related structure mounted in order from the base to the top, and a saddle which is provided for loading longitudinal (or Y axial) sliding (guide) rails and related structure. When the saddle is engaged in lateral movement there will be adequate support area for maintaining it steady to avoid biased swinging as a result of weight suspension load, to prevent it from deformation as well as to assure and increase accuracy, and prolong its life span. Both the leading and rear sides of work table have a single-bevel or double-bevel telescopic protection plate assembly to match with above-said specific structure, and both the left and right sides of saddle have a single-bevel or double-bevel telescopic protection plate assembly. The lower side of each protection plate in the left/right side of saddle has a collection tank for gathering the cutting waste and fluid. In addition, the collection tank may have an automatic delivery device for discharging the cutting waste. As the telescopic protection plates in the external sides of saddle and the plates by the side walls of work table are tightly fitted and an extending cover plate from the internal side has sealed the seam, all the residues such as cutting waste and fluid produced within the effective working range of the machine can be fully disposed thereof.

BRIEF DESCRPITION OF THE DRAWING

DETAILED DESCRIPTION OF THE INVENTION

An improvement for the work table of tooling machine, comprising horizontal (lateral) slide rails mounted at the base and longitudinal (forward-backward) slide rails mounted at the saddle in order to assure and increase tooling accuracy as well as to prolong its life span. In addition with properly bevel telescopic protection plates and delivery device, the system can provide automatic disposal of residues such as cutting waste.

Figure 1:
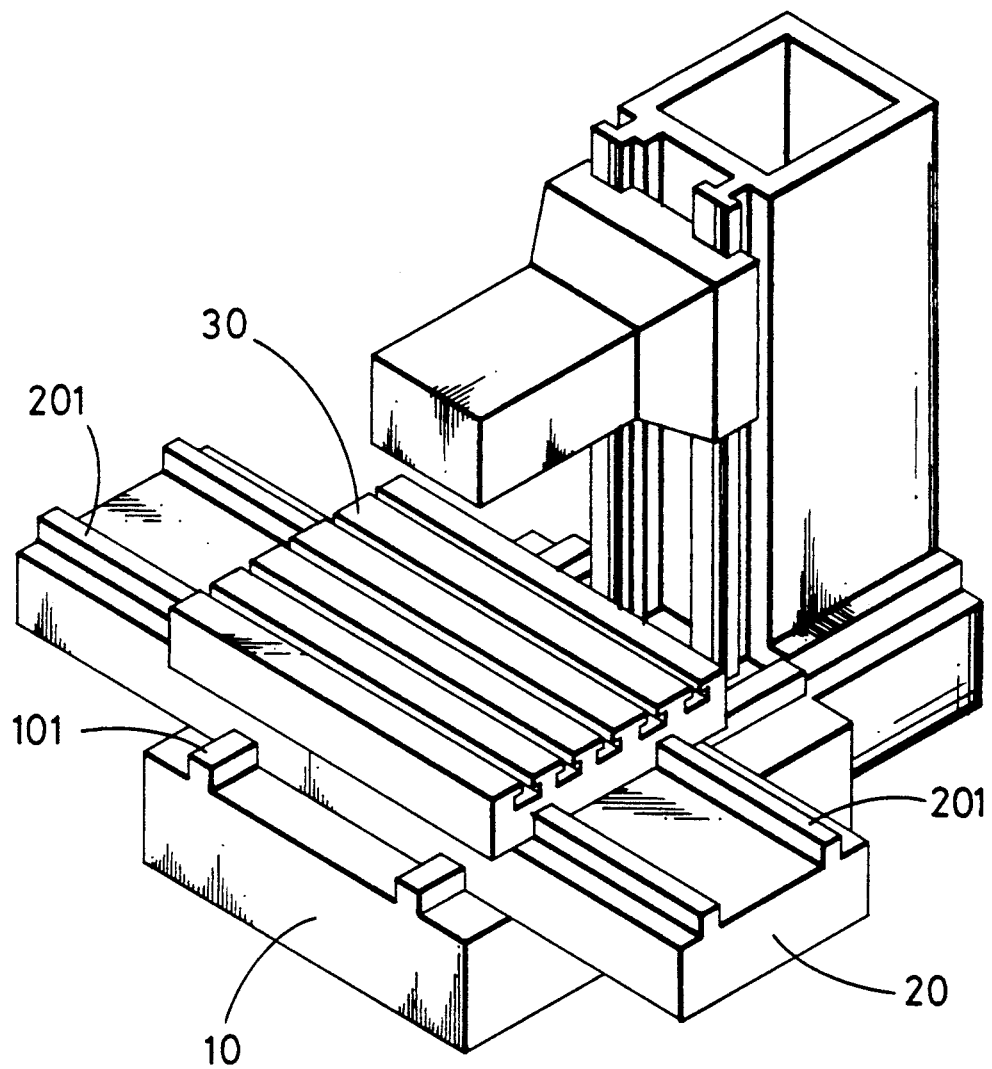
FIG. 1 is an elevational view showing the assembly of work table of conventional tooling machine.

Referring to FIG. 1, the work table of conventional tooling machine comprises longitudinal (forward-backward) slide rails 101 mounted at the base 10 and horizontal (lateral) slide rails 201 mounted at the saddle 20 whereby the saddle 20 is driven to move forwards and backwards, and the work table 30 mounted at the top of saddle 20 is driven to move laterally. Due to the type of assembly, the saddle 20 has to be made into resembling a slender seat body in order to fit the base 10, therefore the work table 30 is constantly engaged in lateral movement on the saddle 20 to result in severely biased swinging because of dead-weight suspension load. Therefore the saddle 20 is liable to get deformed, affect smooth moving and further result in poor accuracy. Besides, the residues of processing such as cutting waste and fluid spreading all over the base of machine are difficult for gathering up and disposition. There are the defects found in the work table of conventional tooling machine in need of improvement.

In view of those defects relating to the structure of work table for the conventional tooling machine, the present invention is hereby provided for improving the defects.

One object of the present invention is to provide a new design of geometrical displacement structure for the work table in combination with bevel telescopic protection plates in order to obtain optimum effect of residue discharge, which is characterized in by that, adequate support area is provided to maintain the saddle steadily moving along the horizontal (lateral) slide rails mounted at the base in order to avoid biased swinging as a result of dead-weight suspension load, to protect it against deformation due to solid assembly in order to assure smooth movement of saddle and increase its accuracy and further to prolong its life span thereof. Each side of saddle has single-bevel telescopic protection plate and high pressure fluid which emits downwardly along the single bevel surface for forcibly carrying residues such as cutting waste into the collection tank and automatically discharged by virtue of automatic delivery device.

The characteristics and other functions of the embodiment in accordance with the present invention are described below.

Figure 2:
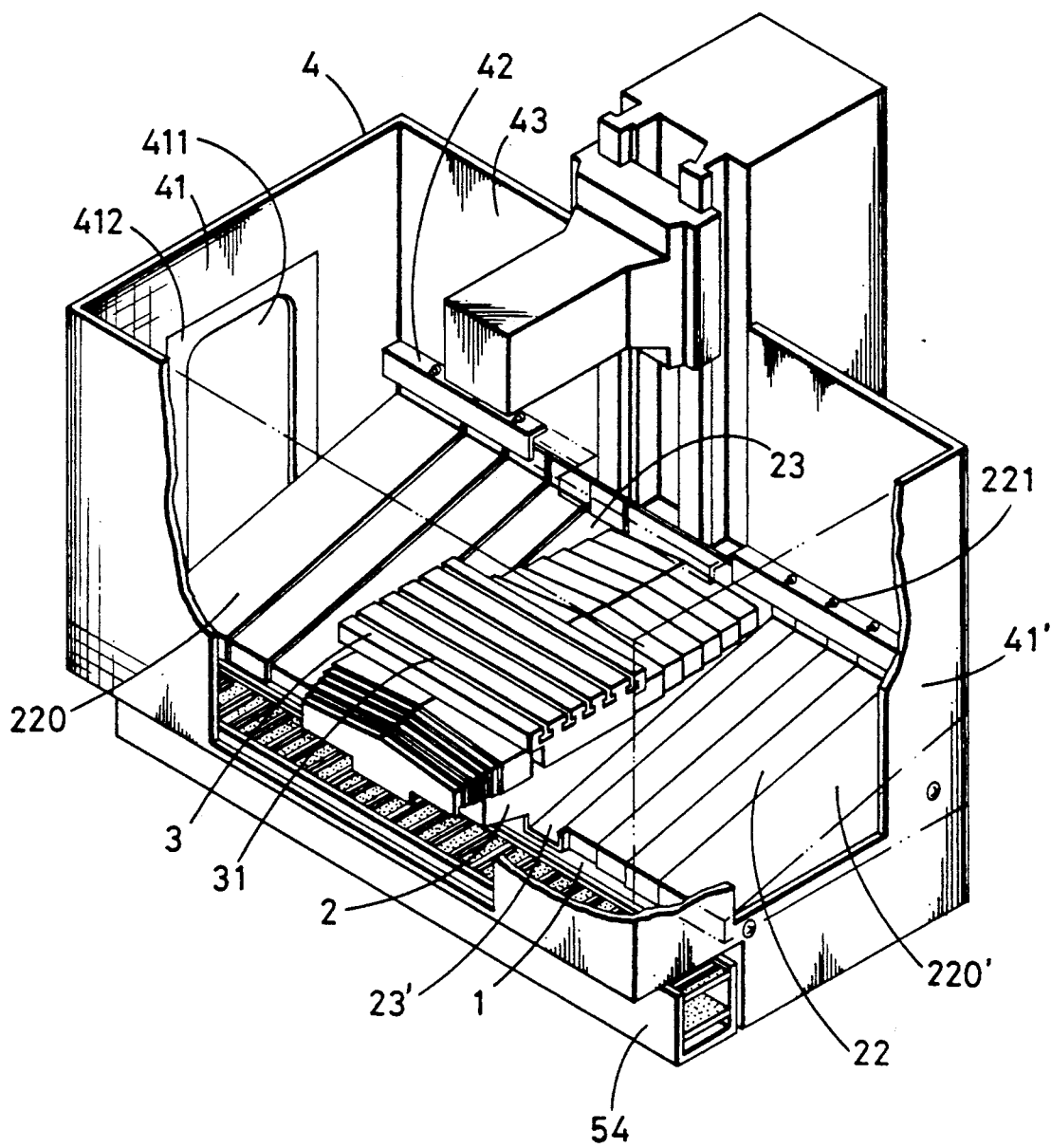
FIG. 2 is a perspective and elevation view showing the assembly of the present invention.
Figure 3:
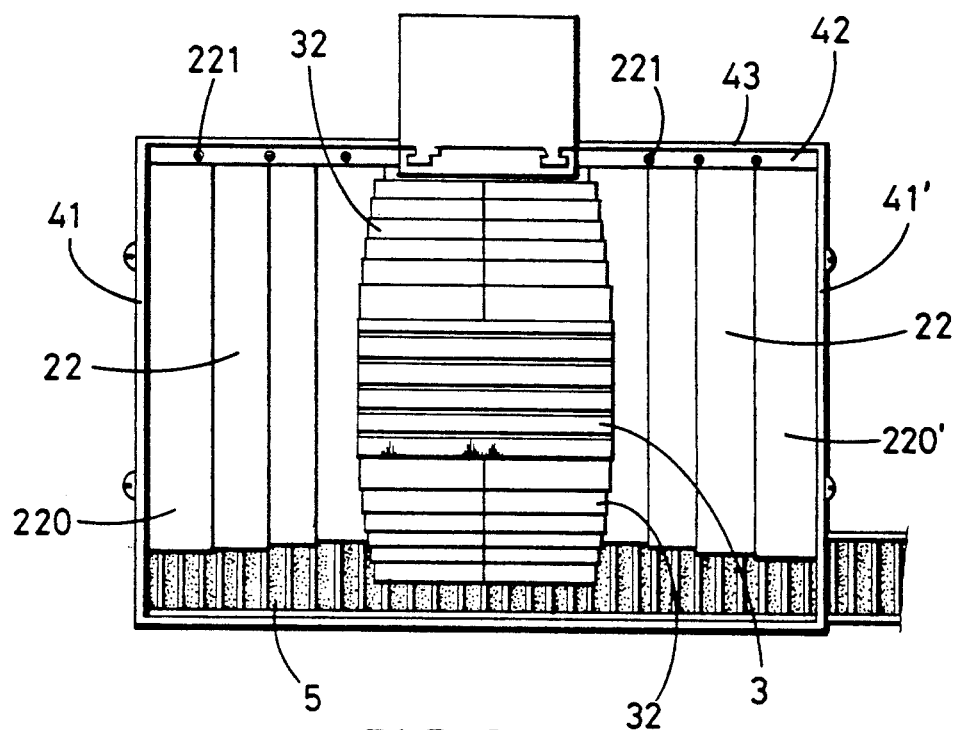
FIG. 3 is a bottom view showing the assembly of the present invention.

Referring to FIG. 2, the present invention comprises a base 1, saddle 2, work table 3 to form a geometrical displacement structure of work table for tooling machine as well as in combination with closed type plate construction 4 to form a closed processing chamber, wherein:

the base 1 is located at the lowest position and having horizontal (lateral) slide rails 11;

the saddle 2 is located above the base 1 and may slide laterally on the base 1, and it has longitudinal (forward-backward) slide rails 21;

the work table 3 is located above the saddle and may slide forwards and backwards on the saddle 2;

each side of saddle 2 and work table 3 has laterally single-bevel telescopic protection plate 22 and double-bevel telescopic protection plate 32, and the top side of the telescopic protection plate 22 of saddle 2 has an extension cover plate 42 which maintains a seamless sealed condition in company with the inner plate 43. The extension cover plate 42 has a row of high pressure fluid nozzle 221, and two external telescopic plates 220, 220' are tightly secured to the side plates 41, 41'.

Figure 4:
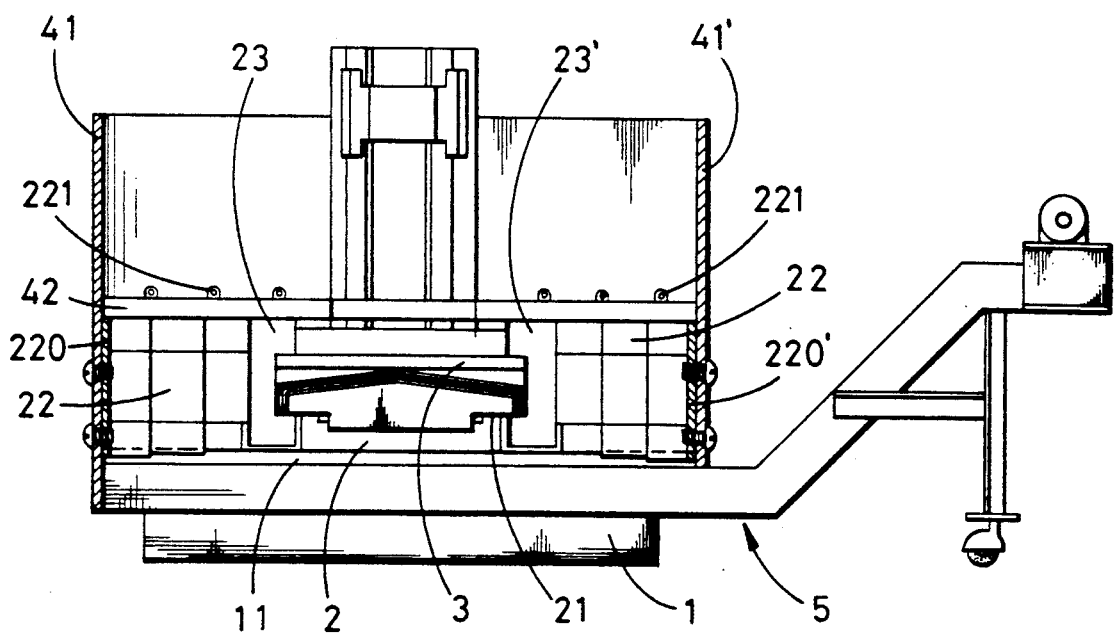
FIG. 4 is a schematic view showing the assembly of the present invention in company with a delivery device.

According to the assembly of above-said members, though the base adopts the design of horizontal slide rails to maintain steady without risk of biased swinging as a result of dead-weight suspension load, while the closed type plate body 4 and telescopic protection plates of saddle 2 maintain seamless contacted and cutting waste produced during the process is automatically discharged into the collection tank 54 with the help of bevel side of telescopic plate, mutual thrust force (when the saddle is moving laterally), and high pressure fluid emitting and flowing downwardly along the bevel side of the plate by virtue of nozzle 221. More specifically, the present invention is centered around the geometrical displacement structure for work table and bevel design or residue discharge plate in order to match a delivery device 5 for the convenience of automatic discharge of residues such as cutting waste. Again referring to FIGS. 2 and 4, the delivery device 5 (spiral type or caterpillar type of a prior art not described herein) is mounted at the collection tank 54 for carrying away the residues from the tank 54 in order to reach the purpose of automatic disposition.

The side plates 41, 41' may have an observation hole 411 and be made from transparent materials to facilitate the inspection of workpiece during the process.

To conclude above statement, the present invention relates to an improvement fully departed from the assembly type of conventional work table for tooling machine. The base adopts horizontal slide rails to avoid the risk of biased swinging or deformation as a result of dead-weight load in order to assure smooth operation of saddle, increase its accuracy and prolong its life span. The single-bevel telescopic protection plates mounted to match the above-said construction and the assembly of high pressure fluid emitting device are helpful to gather up the residues such as cutting waste and to make it easy for automatic disposition. Therefore, it has met the requirement of a new utility model.

Many changes, modifications, variations and other uses and applications of the present invention will, however, become apparent to those skilled in the art after considering the foregoing specification together with the accompanying drawings. All such changes, modifications, variations and other uses and applications which do not depart from the spirit and the scope of the invention are deemed to be covered by the invention which is limited by only by the claims which follow.

I claim:

1. A tooling machine for a workpiece wherein cutting waste is produced, the tooling machine having a base, a front, a back wall, a pair of side walls, a saddle and a work table, the improvement comprising:

the base located at the lowest position of machine and having horizontal (X axial) slide rails;

said saddle being mounted on the base for horizontal (X axial) movement and being driven by a drive mechanism, the base being movable between the front and the back of the tooling machine, the saddle having longitudinal (Y axial) slide rails;

the work table mounted on the saddle and sliding longitudinally along the slide rails on the saddle, the work table having a front side and a back side;

a first protection plate disposed on the base under the saddle, the first protection plate sloping downwardly from the back wall of the tooling machining to the front of the tooling machine, the first protection plate extending between the side walls of the tooling machine;

a second protection plate disposed adjacent to the sides of the work table, said protection plate having a center line forming two side portions, the side portions sloping downwardly from the center line toward the first protection plate;

wherein the cutting waste from the work table falls to the second protective plate and from the second protective plate to the first protective plate, and means to dispose of said cutting waste from the first protective plate to a collection tank.

2. The tooling machine of claim 1, further comprising a high pressure fluid flush to flush the cutting waste from the protection plates to a delivery device disposed for automatic discharge of the cutting waste to the collection tank.

3. The tooling machine of claim 2, wherein a plurality of spaced-apart nozzles for the high pressure fluid flush are mounted on the back wall of the tooling machine above the first protection plate.

4. The tooling machine of claim 1, wherein an observation port is formed in the side walls of the tooling machine for inspection of the workpiece.

5. The tooling machine of claim 1, further comprising an extension cover plate mounted on the back wall of the tooling machine, the first protection plate being connected to said extension cover plate wherein the first protection plate is sealed to said back wall.

6. The tooling machine of claim 1, further comprising a plate mounted on each side wall adjacent to the first protection plate and forming a seal therebetween.

* * * * *